H. J. PARKER.
DEMOUNTABLE RIM.
APPLICATION FILED AUG. 26, 1916. RENEWED SEPT. 12, 1919.
1,340,977. Patented May 25, 1920.
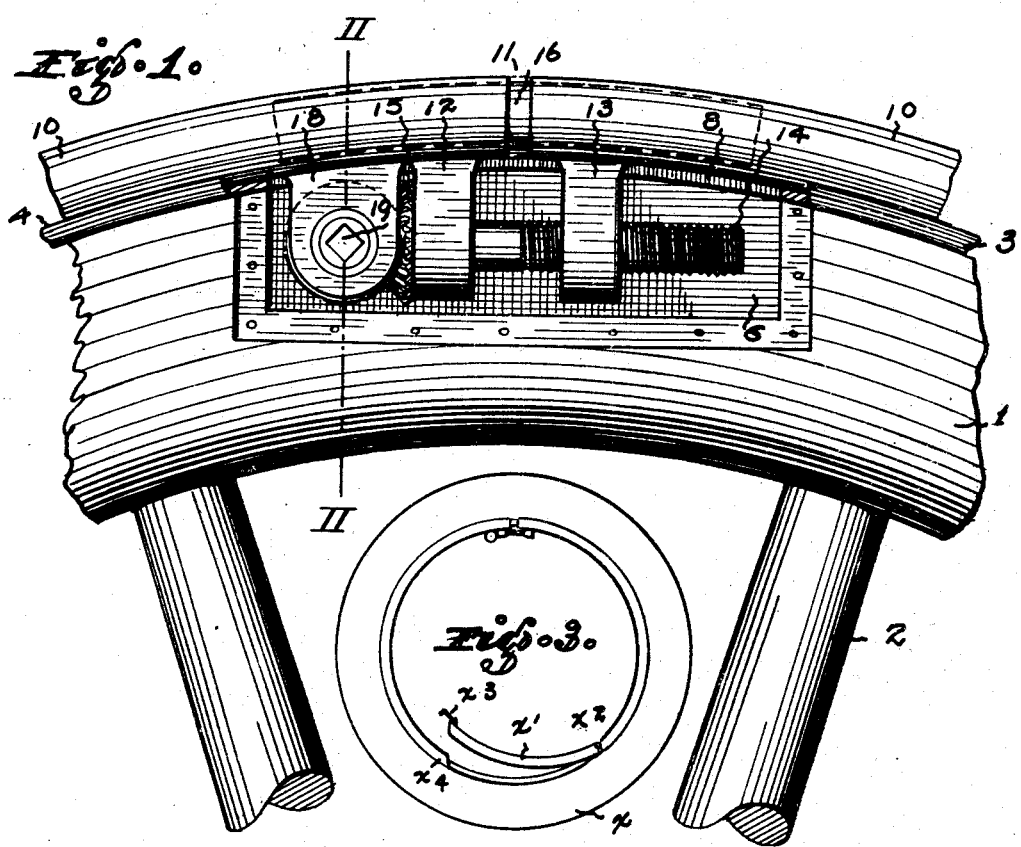
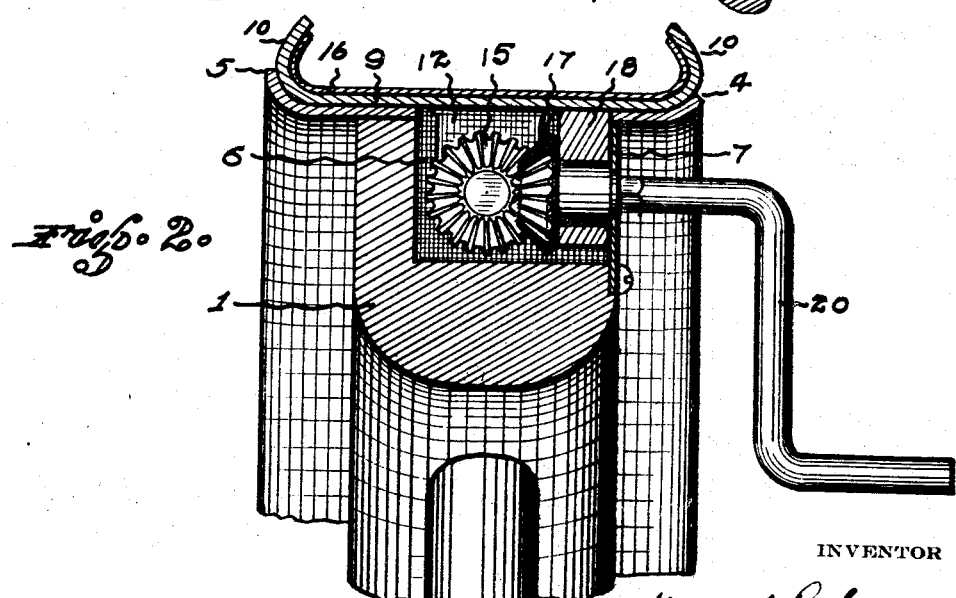
INVENTOR

UNITED STATES PATENT OFFICE.

HARRY J. PARKER, OF SAN FRANCISCO, CALIFORNIA, ASSIGNOR, BY DIRECT AND MESNE ASSIGNMENTS, TO PARKER COLLAPSIBLE RIM CORPORATION, A CORPORATION OF DELAWARE.

DEMOUNTABLE RIM.

1,340,977.     Specification of Letters Patent.     Patented May 25, 1920.

Application filed August 26, 1916, Serial No. 117,101. Renewed September 12, 1919. Serial No. 323,432.

*To all whom it may concern:*

Be it known that I, HARRY J. PARKER, a citizen of the United States, and a resident of the city and county of San Francisco, State of California, have made a new and useful invention—to wit, Improvement in Demountable Rims; and I hereby declare the following to be a full, clear, concise, and exact description of the same.

The invention relates particularly to means for readily attaching and detaching demountable rims for pneumatic tires from vehicle wheels.

Among the objects of this invention are to provide a rim simple in construction that may be easily and quickly attached and detached from vehicle wheels.

In this specification and the annexed drawings, the invention is illustrated in the form considered to be the best, but it is to be understood that the invention is not limited to such form because it may be embodied in other forms; and it is also to be understood that in and by the claims following the description it is desired to cover the invention in whatever form it may be embodied.

In the accompanying one sheet of drawings:

Figure 1 is a fragmentary side elevation of a vehicle wheel having a demountable rim constructed in accordance with this invention applied thereto.

Fig. 2 is a cross section of the same taken on the line II—II, Fig. 1.

Fig. 3 is a diagrammatic side elevation of a pneumatic tire mounted upon a rim, illustrating the collapsible segment of the rim.

In detail the construction illustrated in the drawing includes a standard wheel consisting of the felly 1, the spokes 2 and the usual hub (not shown). The felly band 3 is shrunk onto the felly, and in the present instance is modified in having the upstanding flanges 4 and 5, the latter flange being on the inside of the wheel adjacent to the vehicle, stands higher than the flange 4, for reasons which will be hereinafter explained. The felly is cut away to form a recess 6. In the present instance this recess is shown open at the side of the felly better to disclose the interrelation of parts. In practice this recess can be let into the periphery of the felly without opening the side thereof except for the reception of the operating wrench. The recess 6 is covered by the plate 7, the recess opened through the rim 3 at 8 to receive the expanding and contracting mechanism of the demountable rim.

The demountable rim illustrated in the drawing is the common clencher type, having the inturned flanges 10—10 to engage the clencher bead on pneumatic tires. It is obvious however, that this invention is adaptable to the various types of demountable rims. The rim 9 is severed transversely at 11 and has the lugs 12 and 13 fixed in alinement to the opposite abutting ends thereof. These lugs are connected by the spindle 14 threaded in the lug 13 and swiveled in the lug 12. The head of the spindle is formed by the bevel gear 15 bearing against the lug 12. Rotation of the spindle 14 to the left spreads the ends of the rim apart at the gap 11; rotation of the spindle in the opposite direction has the opposite effect of drawing the ends of the rim together. To support the base of the tire when the ends of the rim are separated, I provide the plate 16 slidable in the opposite ends of the rim inclosing the base of the tire and bridging the gap 11.

As a convenient means for rotating the spindle 14, I provide the bevel pinion 17 having its hub rotatably fitted in the bearing 18 fixed to the end of the rim to hold the pinion 17 in mesh with the gear 15 fixed on the spindle. The hub of the gear is provided with the angular socket 19 to receive the wrench or key 20 for rotating the pinion 17.

The invention operates substantially as follows: The rim 9 is removed by inserting the wrench 20 and rotating the spindle 14 until the rim 9 is expanded until its internal diameter is greater than the diameter of the flange 4 on the band 3. The portion of the rim opposite to the gap 11 is then swung laterally out of engagement with the band 3 over the flange 4, which permits the lugs 12 and 13 and the expanding and contracting mechanisms to be lifted out of the recess 6, through the gap 8 in the periphery of the band 3, entirely removing the rim 9 from the wheel. The rim is assembled on the wheel by reversing this operation by first inserting the lugs 12 and 13 through the gap 8 into the recess 6, then swinging the remainder of the rim into alinement with the felly, with the edge of the rim resting against the flange 5 that is higher than the flange 4 to prevent the rim being displaced from its proper alinement in assembly. The wrench 20 is then rotated which revolves the spindle 14 in threaded engagement with the lug 13 pulling the two abutting ends of the rim toward each other contracting them circumferentially until its internal diameter binds against the external diameter of the band 3, continued rotation of the spindle pulling the rim snugly into engagement with the band between the flanges 4 and 5 which prevents its lateral displacement from the wheel, except by intention as described.

For convenience in removing the tire casing $x$ from the rim, a segment of the rim as at $x^1$ may be hinged as at $x^2$ to permit the collapsing of the rim to facilitate its removal from the bead of the tire base. To insure the continuity of the rim, the latch $x^3$ is provided to engage the end $x^4$.

Having thus described this invention, what I desire to claim and secure by Letters Patent is:

1. A demountable rim divided transversely and provided with a collapsible segment, a plate slidably engaging the contiguous ends of the divided portion of said rim, a spindle rotatably supported by one of said ends and having an adjustable engagement with the other end, and means for rotating said spindle.

2. A demountable rim divided transversely and provided with a collapsible segment spaced from the divided portion, inwardly extending lugs attached to the contiguous ends of the divided portion of said rim, one of said lugs being provided with a threaded opening, a spindle rotatably mounted in the other lug, and engaging said threaded opening, and means for rotating the spindle.

In testimony whereof, I have hereunto set my hand at San Francisco, California, this 11th day of August, 1916.

HARRY J. PARKER.

In presence of—
 BALDWIN VALE,
 A. J. HENRY.